United States Patent [19]

Sakai et al.

[11] Patent Number: 4,845,566
[45] Date of Patent: Jul. 4, 1989

[54] SOLID-STATE IMAGE PICKUP APPARATUS HAVING CONTROLLABLE MEANS FOR ELIMINATING SURPLUS CHARGE

[75] Inventors: Shinji Sakai; Masahiro Takei, both of Yokohama, Japan

[73] Assignee: Canon Kabushiki Kaisha, Tokyo, Japan

[21] Appl. No.: 51,456

[22] Filed: May 19, 1987

[30] Foreign Application Priority Data

May 21, 1986 [JP] Japan .................. 61-114915

[51] Int. Cl.⁴ ............................................ H04N 5/335
[52] U.S. Cl. .................... 358/213.24; 358/213.19; 358/213.31
[58] Field of Search ............ 358/213.19, 213.13, 358/213.16, 213.23, 213.24, 213.31, 909; 307/311

[56] References Cited

U.S. PATENT DOCUMENTS

| | | | |
|---|---|---|---|
| 3,896,485 | 7/1975 | Early | 357/24 |
| 3,953,733 | 4/1976 | Levine | 250/330 |
| 4,233,632 | 11/1980 | Akiyama | 358/213.19 |
| 4,328,432 | 5/1982 | Yamazaki | 307/221 |
| 4,485,315 | 11/1984 | Collet et al. | 307/311 |
| 4,622,596 | 11/1986 | Suga et al. | 358/335 |
| 4,644,403 | 2/1987 | Sakai et al. | 358/213 |
| 4,663,669 | 5/1987 | Kinoshita et al. | 358/213.19 |
| 4,723,169 | 2/1988 | Kaji | 358/213.31 |
| 4,743,778 | 5/1988 | Takatsu et al. | 307/311 |
| 4,774,585 | 9/1988 | Suga et al. | 358/213.19 |

FOREIGN PATENT DOCUMENTS

46677 11/1977 Japan .
223389 11/1985 Japan .

Primary Examiner—James J. Groody
Assistant Examiner—Robert M. Bauer
Attorney, Agent, or Firm—Fitzpatrick, Cella, Harper & Scinto

[57] ABSTRACT

A solid-state image pickup apparatus having an electrode to eliminate surplus charges by surface charge recombination. The operating frequency which is applied to the electrode to perform the recombination is changed in accordance with the variable exposure time during the converting operation to change anti-blooming capability.

21 Claims, 5 Drawing Sheets

SOLID-STATE IMAGE PICKUP APPARATUS HAVING CONTROLLABLE MEANS FOR ELIMINATING SURPLUS CHARGE

BACKGROUND OF THE INVENTION

1. Field of the Invention

The present invention relates to a solid-state image pickup apparatus using a solid-state image pickup device and, more particularly, to a solid-state image pickup apparatus which can control the exposure time.

2. Related Background Art

Hitherto, as shown in Japanese Laid-Open Patent Gazette No. 138371/1981, there has been considered a solid-state image sensor such as a CCD or the like in which in order to prevent blooming, the surplus carriers are extinguished by use of surface recombination in place of providing an overflow drain in the photo sensing surface.

Such an image sensor has advantages such that since the aperture ratio in the photo sensing surface is not sacrificed, the sensitivity is high and the integration degree can be improved, so that the horizontal resolution can be raised and the like.

Figure 1:
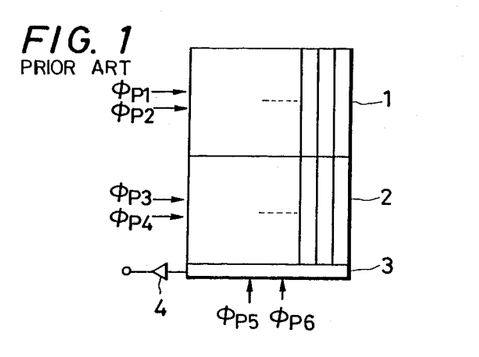
FIG. 1 is a diagram showing an example of a constitution of an image sensor which can prevent blooming.
Figure 2:
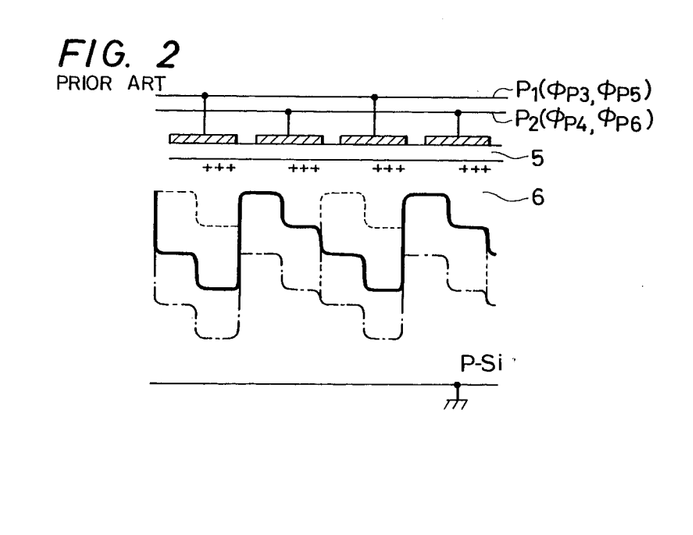
FIG. 2 is a cross sectional diagrammatical view of the image sensor of FIG. 1.
Figure 3:
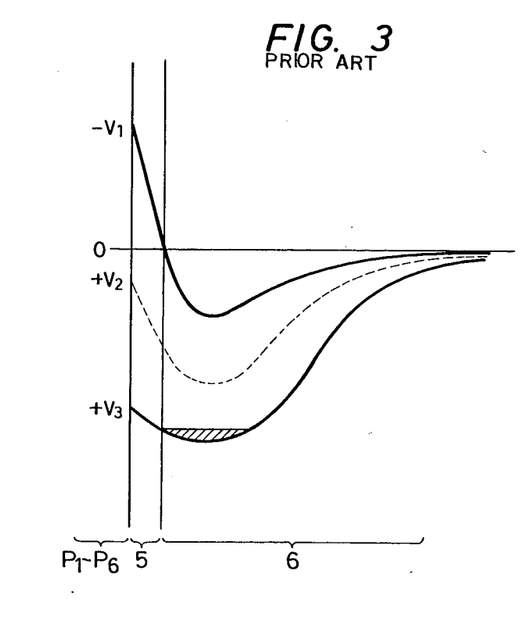
FIG. 3 is a diagram showing a potential distribution in the substrate of the image sensor of FIG. 1.

FIGS. 1 to 3 are diagrams for explaining a method of preventing blooming by the foregoing surface recombination. FIG. 1 is a front view of a general frame transfer type CCD. In the diagram, reference numeral 1 denotes a photo sensing section consisting of a plurality of vertical shift registers having photo sensitive properties.

A storage section 2 consists of a plurality of vertical shift registers which are shielded against the light.

Numeral 3 denotes a horizontal shift register. By simultaneously shifting the data in each vertical shift register of the storage section 2 by one bit, the data is stored into the horizontal shift register. Next, by allowing the register 3 to perform the horizontal shift operation, the video signal can be obtained from an output amplifier 4.

In general, the data formed in each vertical shift register of the photo sensing section 1 is vertically transferred into the storage section 2 within the vertical blanking period in the standard television system. This data is sequentially read out one line by one from the horizontal shift register 3 within the next vertical scan period.

It is assumed that each of the photo sensing section 1, storage section 2, and horizontal shift register 3 is double-phase driven and their respective shift electrodes are $P_1$, $P_2$, $P_3$, $P_4$, $P_5$, and $P_6$, and their shift clock signals are $(\phi_{p1}, \phi_{p2})$, $(\phi_{p3}, \phi_{p4})$, and $(\phi_{p5}, \phi_{p6})$.

FIG. 2 is a diagram showing a potential profile under the shift electrodes $P_1$ to $P_6$. As shown in this diagram, each electrode is provided for a P-type silicon substrate 6 through an insulating layer 5. The portion having a low potential and the portion having a high potential with respect to the electrons are formed under each electrode by way of ion implantation or the like. When the low-level voltage $XV_1$ is applied to the electrodes $P_2$, $P_4$, and $P_6$ and the high-level voltage $V_2$ is applied to the electrodes $P_1$, $P_3$, and $P_5$, the potentials as shown by solid lines in the diagram are formed. On the contrary, when the low-level voltage $V_1$ is applied to the electrodes $P_1$, $P_3$, and $P_5$ and the high-level voltage $V_2$ is applied to the electrodes $P_2$, $P_4$, and $P_6$, the potentials as shown by broken lines in the diagram are formed.

Therefore, by applying the alternating voltages to the electrodes $P_1$, $P_3$, and $P_5$ and to the electrodes $P_2$, $P_4$, and $P_6$ in opposite phases, the carriers are sequentially transferred in one direction (to the right in the diagram).

In the diagram, an alternate long and short dash line denotes the potential in the case where a large positive voltage $V_3$ is applied to the electrodes. Since the well of this potential is in the inverted state, the surplus carriers above a predetermined amount are recombined with the majority carriers and are extinguished.

FIGS. 3 is a diagram showing such an electrode voltage and a shape of internal potential with respect to the direction of thickness of the semiconductor substrate 6. As will be obvious from this diagram, the potential well is shallow to the electrode voltage $V_3$ and the second state in which the surplus carriers are recombined with the majority carriers at the interface with the insulating layer is obtained.

On the other hand, at the electrode voltage $-V_1$, the accumulation state is obtained as the first state. The majority carriers are likely to be collected around the interface. (For example, the majority carriers are supplied from the channel stopper region (not shown)).

Therefore, for example, by alternately applying the voltages $-V_1$ and $V_3$ to the electrode $P_1$ in the state in which the barrier was formed by applying the voltage $-V_1$ to the electrode $P_2$, the minority carriers which are accumulated under the electrode $P_1$ are suppressed to an amount below a predetermined amount.

However, the image sensor using such a charge recombination has an inconvenience such that the clock signal for recombination is mixed into the output signal and causes noise.

Therefore, in order to remove such clock signal moise, the following method has already been proposed by the same applicant as this application. This method will be explained in conjunction with FIG. 4. The frame transfer type CCD of the single-phase driving system will be described.

Figure 4:
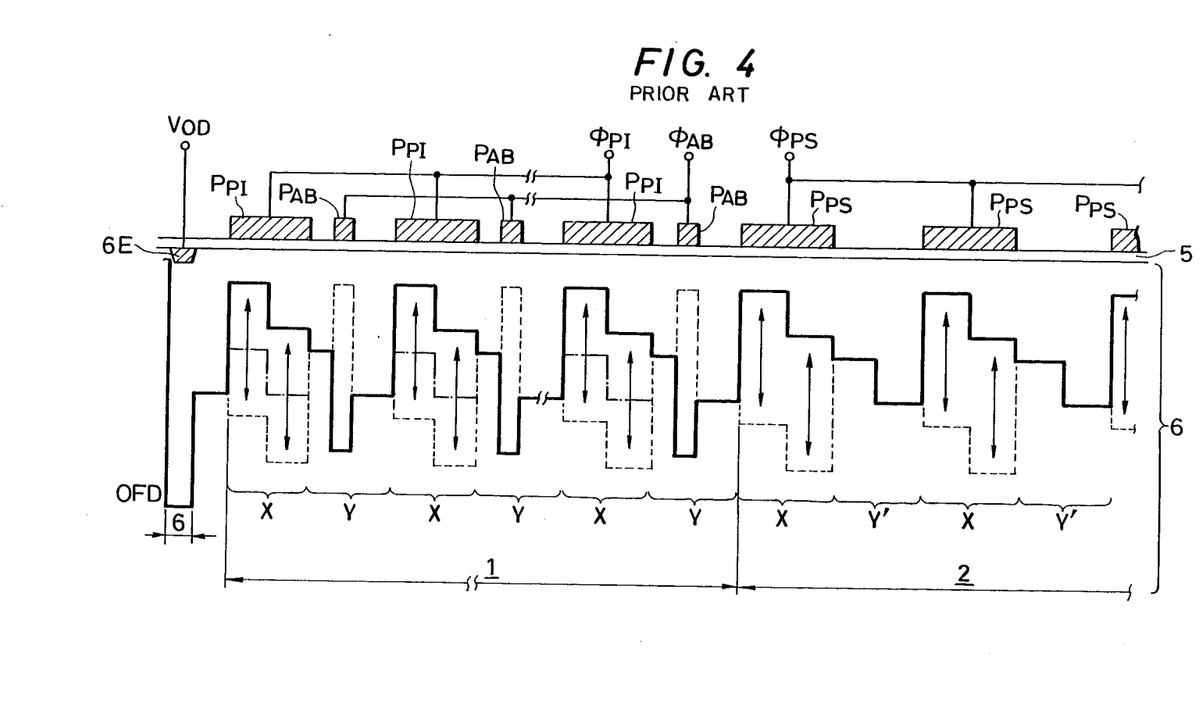
FIG. 4 is a cross sectional diagrammatical view showing another conventional type of image sensor.

FIG. 4 is a diagram showing an electrode structure of the cross section in the boundary region of the photo sensing section 1 and storage section 2 and an outline of the potentials.

In the diagram $P_{PI}$, denotes a shift electrode to apply the shift clock signal $\phi_{PI}$ of the photo sensing section; $P_{AB}$ denotes a recombination control electrode as recombining means to apply the recombination clock signal $\phi_{AB}$; $P_{PS}$ is a shift electrode to apply the shift clock signal $\phi_{PS}$ of the storage section; and 6E is an n+region constituting the overflow drain. $\phi_{AB}$ indicated the clock signal to recombine the surplus charges with the holes at the center of the surface recombination.

The potential state indicated by the solid lines in the diagram is obtained when the low-level voltage was applied as $\phi_{PI}$ and $\phi_{PS}$ and the high-level voltage was applied as $\phi_{AB}$. The broken line indicates the potential state which is obtained when the high-level voltage was applied as $\phi_{PI}$ and $\phi_{PS}$ and the low-level voltage was applied as $\phi_{AB}$.

The stairway of the potentials as shown in the diagram is formed in the substrate 6 by way of ion implantation. Although not shown, for example, a P-type inverted phase to constitute the virtual electrode is formed under the insulating layer which is not covered by the electrodes $P_{PI}$, $P_{PS}$, and $P_{AB}$, namely, in the boundary portion between the insulating layer and the semiconductor substrate.

Therefore, the potential in the semiconductor region which is not covered by the electrode is not changed depending on the bias to each electrode.

Figure 5:
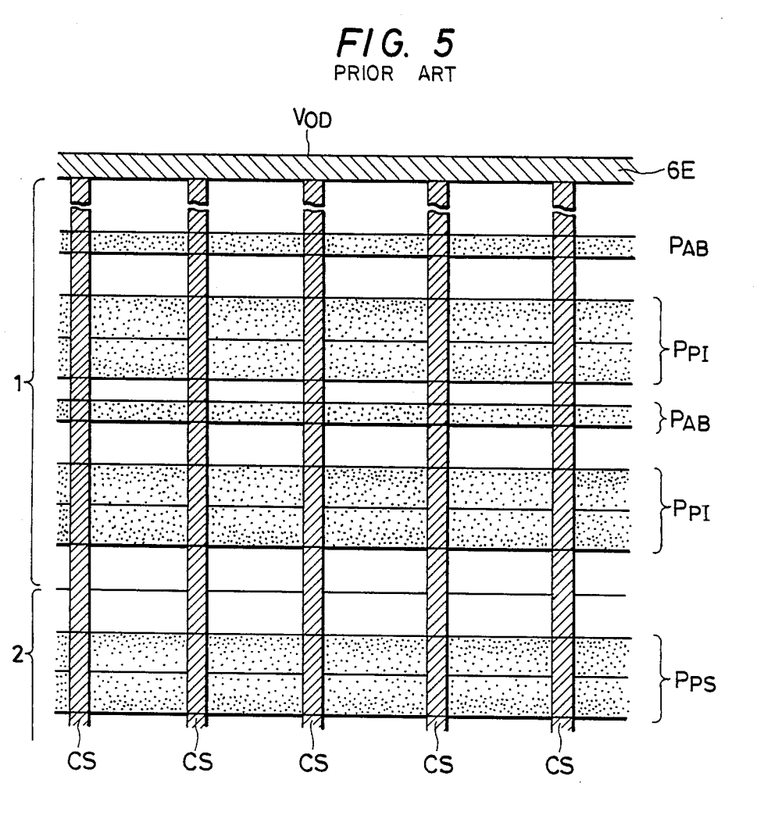
FIG. 5 is a diagram showing an electrode pattern of the constitution shown in FIG. 4.

FIG. 5 is a diagram showing an example of an electrode pattern in the region shown in FIG. 4. In the diagram, CS denotes a channel stop to prevent the movement of the charges in the horizontal direction.

With the constitution shown in FIGS. 4 and 5, the width of the electrode $P_{AB}$ to recombine the charges can be set to be sufficiently smaller than the width of the shift electrode $P_{PI}$, so that the efficiency of eliminating the surplus charges can be raised.

On the other hand, in the CCD image sensor of the single-phase driving system, the recombining operation of the charges can be performed independently of the transferring operation.

Moreover, the foregoing recombination controlling structure of the image sensor can be realized by the step of forming the polysilicon gate for electrodes which can be manufactured by the same process as that of the channel stop and by the ion implantation step of forming a stairway of the interval potentials.

With such a constitution, even if an object having remarkable luminance level exists in the pickup image, the bad influence such as a blooming or the like can be prevented.

However, by supplying an anti-blooming pulse to the image sensor, the electric power consumption of the sensor itself increases, so that additional heat is generated.

Therefore, in an image sensor where sufficient heat radiation measures are not taken, the dark current component increases. In particular, there occurs an inconvenience such that the S/N ratio deteriorates in the low-luminance portion.

To prevent such an inconvenience, a method whereby the frequency of the recombination pulse is set to a low frequency is considered. In this case, however, there occurs a drawback such that when the exposure time is short, the blooming is imperfectly eliminated.

SUMMARY OF THE INVENTION

It is, therefore, an object of the present invention to provide a solid-state image pickup apparatus in which blooming, dark current, and the like can be effectively eliminated irrespective of the long exposure time or short exposure time in consideration of the foregoing drawbacks.

To accomplish this object, according to an embodiment of the present invention, in a solid-state image pickup apparatus having means for eliminating surplus charges by surface charge recombination, the operating frequency for performing the recombination is changed in accordance with the exposure time.

The operating frequency for performing the surface charge recombination is changed in accordance with the exposure time, thereby preventing the occurrence of blooming and unnecessary dark current.

The above and other objects and features of the present invention will become apparent from the following detailed description and the appended claims with reference to the accompanying drawings.

BRIEF DESCRIPTION OF THE DRAWINGS

FIGS. 1 to 5 are diagrams for explaining the anti-blooming processing operation which has conventionally been known, respectively;

DESCRIPTION OF THE PREFERRED EMBODIMENT

An embodiment of the present invention will be described in detail hereinbelow.

Figure 6:
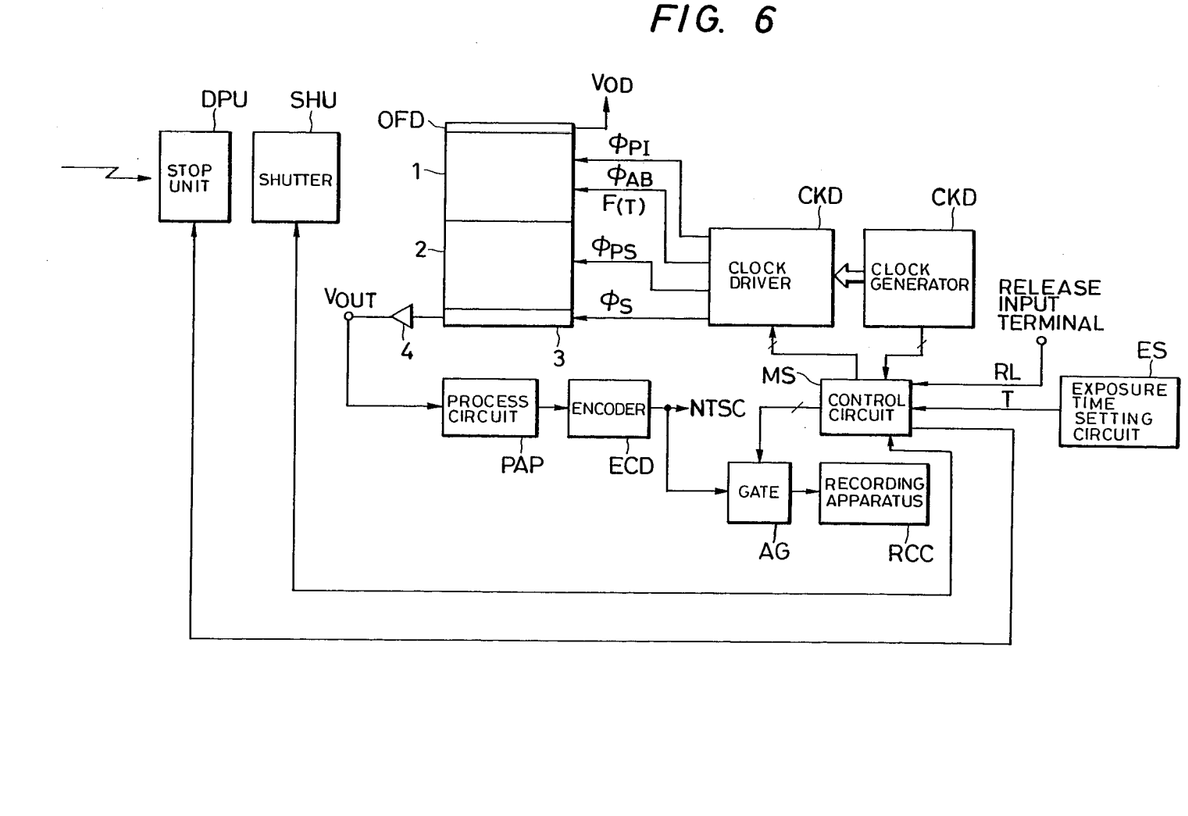
FIG. 6 is a block constitutional diagram showing an embodiment of the present invention.

FIG. 6 is an overall constitutional diagram of an embodiment to which the invention is applied. In the diagram, the same parts and components as those shown in FIGS. 1 to 5 mentioned above are designated by the same reference numerals.

SHU denotes a shutter unit and DPU is a stop unit which is controlled by a control circuit MS. OFD denotes an overflow drain to drain the surplus charges and is provided on the side opposite to the storage section 2 of the photo sensing section 1. The OFD is biased by a constant positive voltage $V_{OD}$.

On the other hand, shift clock signals $\phi_{PS}$ and $\phi_S$ are applied to the storage section 2 and horizontal shift register 3, respectively. Only the photo sensing section 1 can receive the light. The storage section 2, register 3, amplifier 4, and the like are shielded against the light.

CKD denotes a clock driver which functions as control means for supplying the clock pulses $\phi_{PI}$, $\phi_{AB}$, $\phi_{PS}$, $\phi_S$, and the like to the image pickup device; CKG is a clock generator to generate a timing signal to form those pulses; PAP is a process circuit to produce each chrominance signal from the output image pickup signal; and ECD is an encoder. The video signal supplied from the process circuit PAP is converted by the encoder ECD into a signal of a standard television system such as, e.g., an NTSC signal.

A recording apparatus RCC records one picture plane in accordance with the opening and closure of an analog gate AG.

The control circuit MS switches the output states of various kinds of pulses by the clock driver CKD and can switch the frequency of the recombination clock $\phi_{AB}$. The control circuit MS opens or closes the analog gate AG in response to an RL signal (first and second release outputs) from a release input terminal.

An output signal T (indicative of the exposure time) of an exposure time setting circuit ES is supplied to the control circuit MS. A clock frequency F(T) of the clock signal $\phi_{AB}$ which is output from the clock driver is varied in response to the output signal T. The exposure time setting circuit ES sets the exposure time to a predetermined time in accordance with the set stop value in the case of the aperture-priority AE mode or with the luminance level of the object derived by an external photometric device or the like in the case of the program mode.

Figure 7:
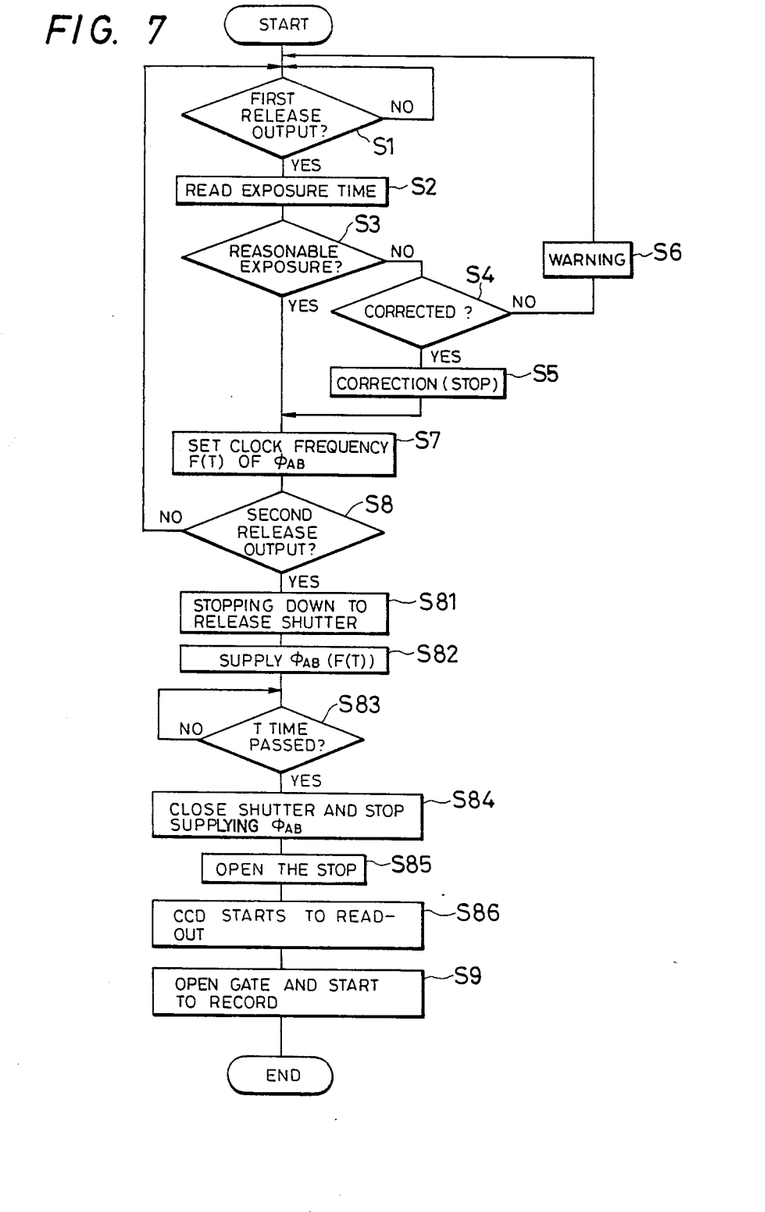
FIG. 7 is a flowchart showing a control procedure of the invention.

FIG. 7 is a flowchart showing a control procedure of the embodiment.

First, when the first release output RL is obtained from a release input terminal at the first stroke by depressing a two-stroke release switch (not shown) (step S1), the exposure time signal T which is derived from the exposure time setting circuit ES is read (step S2). A check is made to see if reasonable exposure is obtained or not on the basis of the luminance of the object and the stop value (step S3). In the starting state of step S1, the stop is open and the shutter is closed.

If a reasonable exposure is not obtained in step S3, a check is made to see if the stop value can be corrected to the proper stop value on the basis of the present set exposure time or not (step S4). If YES, the stop value is corrected to the proper stop value (step S5). If NO in step S4, the operator is warned (step S6). Then, the processing routine is returned to step S1. Therefore, the image pickup and recording operations cannot be performed.

When it is determined that the photographing condition is proper in the memory of the control circuit MS, the operating frequency F(T) of the anti-blooming clock pulse $\phi_{AB}$ is set in accordance with the exposure time indicated by the exposure time signal T (step S7). Namely, when the exposure time is long, the operating frequency F(T) is set to a low frequency. When the exposure time is short, the F(T) is set to a high frequency.

After the operating frequency F(T) was set in the memory of the control circuit, a check is made to see if the second release output at the second stroke has been obtained from the release switch (not shown) or not (step S8). When the second release output is not obtained, the processing routine is returned to step S1. If the second release output was detected in step S8, the stop is stopped down to a set value (if a corrected value, it is set to the corrected value) and the shutter is released in step S81. Next, the clock signal $\phi_{AB}$ of the frequency F(T) is supplied (step S82). Further, a check is made in step S83 to see if the time T has elapsed or not. If YES, the shutter is closed and the supply of the clock signal $\phi_{AB}$ is stopped in step S84. The stop is opened in step S85. Then, the read-out of the image data from the CCD is started in step S86. In the next step S9, the analog gate AG is opened and the image signal of one picture plane is supplied to the recording apparatus RCC.

As described above, according to the invention, the operating frequency to perform the surface charge recombination is changed in accordance with the exposure time. Therefore, blooming, unnecessary dark current, and the like can be effectively eliminated irrespective of the exposure time of the image sensor, so that the image signal can be obtained with a high S/N ratio.

We claim:
1. An image pickup apparatus comprising:
   (a) image sensing means for converting an optical image into an electrical signal;
   (b) signal generating means for alternately changing a level of a partial potential in said image sensing means during the converting operation;
   (c) setting means for variably setting a time period of the converting operation; and
   (d) control means for variably controlling a frequency of the alternate changing of the level in accordance with the time period set by said setting means.

2. An image pickup apparatus according to claim 1, wherein said image sensing means eliminates a part of the electrical signal converted in the image sensing means by changing the level of the partial potential during the converting operation.

3. An image pickup apparatus according to claim 1, wherein said signal generating means forms a predetermined potential well in said image sensing means during the converting operation and also alternately changes the height of a part of said potential well.

4. An image pickup apparatus according to claim 1, wherein said signal generating means alternately changes the level of the partial potential only during the converting operation.

5. An image pickup apparatus according to claim 1, further comprising an exposure member for shutting off light which enters said image sensing means.

6. An image pickup apparatus according to claim 5, wherein said setting means sets the time period of the converting operation by setting an opening time of said exposure member.

7. An image pickup apparatus according to claim 5, wherein said signal generating means starts to alternately change the level of the partial potential when said exposure member is open.

8. An image pickup apparatus according to claim 7, wherein said signal generating means stops the alternate changing of the level of the partial potential when said exposure member is closed.

9. An image pickup apparatus according to claim 1, wherein said control means sets said frequency low when the period of time set by said setting means is relatively long, and said control means sets said frequency high when the period of time set by said setting means is relatively short.

10. An image pickup apparatus comprising:
   (a) image sensing means for converting an optical image into an electrical signal during a selected one of various predetermined periods, said image sensing means being able to variably control an anti-blooming capability; and
   (b) control means for changing the anti-blooming capability of said image sensing means in accordance with the length of said predetermined period.

11. An image pickup apparatus according to claim 10, wherein said anti-blooming capability can be varied by changing the level of a partial pontential in said image sensing means.

12. An image pickup apparatus according to claim 11, wherein said image sensing means eliminates a part of the electrical signal in said image sensing means by changing the level of the partial potential during the converting operation.

13. An image pickup apparatus comprising:
   (a) image sensing means for converting an optical image into an electrical signal, said image sensing means being able to variably control an anti-blooming capability;
   (b) a shutter for changing a light incident time of said image sensing means; and
   (c) control means for variably controlling said anti-blooming capability in accordance with the length of the light incident time of the image sensing means.

14. An image pickup apparatus according to claim 13, wherein said image sensing means eliminates a part of the electrical signal in the image sensing means by changing the anti-blooming capability during the converting operation.

15. An image pickup appartus comprising:
   (a) image sensing means for converting an optical image into an electrical signal;
   (b) exposure control means for changing an exposure time of said image sensing means; and
   (c) control means for changing the level of a partial potential in the image sensing means during the converting operation in the image sensing means, and for changing a frequency of the changing in accordance with the exposure time by said exposure control means.

16. An image pickup apparatus according to claim 15, wherein said image sensing means eliminates a part of the electrical signal in the image sensing means by changing the level of the partial potential during the converting operation.

17. An image pickup apparatus according to claim 15, wherein said control means forms a predetermined potential well in said image sensing means during the converting operation and also periodically changes the height of a part of said potential well.

18. An image pickup apparatus according to claim 15, wherein said exposure control means changes the exposure time using a shutter.

19. An image pickup apparatus according to claim 15, wherein said control means starts to change the potential level when said shutter is open.

20. An image pickup apparatus according to claim 20, wherein said control means stops the change of the potential level when said shutter is closed.

21. An image pickup apparatus according to claim 15, wherein said control means sets the frequency low when the exposure time is relatively long, and said control means sets the frequency high when the exposure time is relatively short.

* * * * *

UNITED STATES PATENT AND TRADEMARK OFFICE
CERTIFICATE OF CORRECTION

PATENT NO. : 4,845,566

DATED : July 4, 1989

INVENTOR(S) : Sakai et al.

It is certified that error appears in the above-identified patent and that said Letters Patent is hereby corrected as shown below:

COLUMN 1
  Line 59, change "voltage $XV_1$" to --voltage $-V_1$--.

COLUMN 2
  Line 34, change "moise" to --noise--.

Signed and Sealed this

Tenth Day of July, 1990

Attest:

HARRY F. MANBECK, JR.

*Attesting Officer*   Commissioner of Patents and Trademarks